(12) United States Patent
Lewis

(10) Patent No.: US 6,275,792 B1
(45) Date of Patent: Aug. 14, 2001

(54) METHOD AND SYSTEM FOR GENERATING A MINIMAL SET OF TEST PHRASES FOR TESTING A NATURAL COMMANDS GRAMMAR

(75) Inventor: James R. Lewis, Delray Beach, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/305,625

(22) Filed: May 5, 1999

(51) Int. Cl.[7] .............................. G06F 17/27; G10L 15/18; G10L 15/28
(52) U.S. Cl. ........................... 704/9; 704/255; 704/257; 704/275
(58) Field of Search ................................... 704/1, 8, 9, 10, 704/251, 255, 257, 270, 275, 277; 717/1, 4, 5

(56) References Cited

U.S. PATENT DOCUMENTS

| | | | |
|---|---|---|---|
| 5,642,519 | * 6/1997 | Martin ..................................... | 704/9 |
| 5,664,173 | * 9/1997 | Fast ......................................... | 707/4 |
| 5,754,860 | * 5/1998 | McKeeman et al. ..................... | 717/4 |
| 5,802,370 | * 9/1998 | Sitbon et al. ............................ | 717/1 |
| 5,970,451 | * 10/1999 | Lewis et al. ........................... | 704/251 |
| 5,991,712 | * 11/1999 | Martin ..................................... | 704/9 |
| 5,995,918 | * 11/1999 | Kendall et al. ......................... | 704/1 |
| 6,094,635 | * 7/2000 | Scholz et al. ......................... | 704/270 |
| 6,115,820 | * 9/2000 | Lewis .................................... | 713/200 |

* cited by examiner

*Primary Examiner*—Joseph Thomas
(74) *Attorney, Agent, or Firm*—Akerman Senterfitt

(57) ABSTRACT

A method for automatically generating a minimal set of test phrases for testing a natural commands grammar includes the steps of selecting a line of text in the natural commands grammar; forming a test phrase for the selected line of text; detecting a previous inclusion of the test phrase in the minimal set of test phrases; and, adding the test phrase to the minimal set of test phrases only if the test phrase has not been detected as having been previously included in the minimal set of test phrases in the detecting step.

10 Claims, 5 Drawing Sheets

FIG. 1

| | |
|---|---|
| //This is a comment | |
| <<root>>= <go_sentence> | -> (1) |
| I <move_contence> | -> (1) |
| I <copy_sentence> | -> (1) |
| | |
| //go(where) | |
| <go_sentence> = <phrase1> | -> go({1}) |
| I <phrase2> NOW | -> go({1}) |
| I <phrase3><phrase4> | -> go({2}) |
| | |
| //move(what, where) | |
| <move_sentence> = MOVE THIS TO TOP | -> move(selection, top) |
| I RELOCATE THIS TO BOTTOM | -> move(selection, bottom) |
| I PUT <phrase5> | -> move({2}) |
| I PUT <phrase6> | -> move({2}) |
| | |
| // copy(what, where) | |
| <copy_sentence> = COPY <phrase6> | -> copy({2}) |
| I COPY <phrase5> | -> copy({2}) |
| | |
| <phrase1> = GO TO THE TOP | -> topfile |
| I GO TO THE BOTTOM | -> bottomfile |
| I <subphrase1> | -> {1} |
| I GO TO THE <subphrase2> | -> {4} |
| I <subphrase1> NOW | -> {1} |
| | |
| //This is another comment | |
| | |
| <phrase2> = END OF FILE | -> bottomfile |
| | |
| <phrase3> = JUMP TO THE | -> null |
| | |
| <phrase4> = TOP OF THE DOCUMENT | -> topfile |
| I BOTTOM OF THE DOCUMENT | -> bottomfile |
| I BEGINNING OF THE LINE | -> begline |
| I END OF LINE | -> endline |
| | |
| <phrase5> = THE PREVIOUS WORD TO THE TOP | -> previousword, top |
| I THE PREVIOUS WORD TO THE BOTTOM | -> previousword, bottom |
| | |
| <phrase6> = THE PREVIOUS WORD TO THE END OF THE LINE | -> previousword, endline |
| I THE PREVIOUS WORD TO THE BEGINNING OF THE LINE | -> previousword, begline |
| | |
| <subphrase1> = END OF LINE | -> endline |
| | |
| <subphrase2> = BEGINNING OF LINE | -> begline |
| I START OF LINE | -> begline |

| Tested Structure | Minimal Set Of Test Phrases | Translation Rule |
| --- | --- | --- |
| START OF LINE | GO TO THE START OF LINE | go(begline) |
| BEGINNING OF LINE | GO TO THE BEGINNING OF LINE | go(begline) |
| END OF LINE | END OF LINE NOW | go(endline) |
| THE PREVIOUS WORD TO THE BEGINNING OF THE LINE | COPY THE PREVIOUS WORD TO THE BEGINNING OF THE LINE | copy(previousword, begline) |
| THE PREVIOUS WORD TO THE END OF THE LINE | PUT THE PREVIOUS WORD TO THE END OF THE LINE | move(previousword, endline) |
| THE PREVIOUS WORD TO THE BOTTOM | COPY THE PREVIOUS WORD TO THE BOTTOM | copy(previousword, bottomfile) |
| THE PREVIOUS WORD TO THE TOP | PUT THE PREVIOUS WORD TO THE TOP | move(previousword, topfile) |
| END OF THE LINE | JUMP TO THE END OF THE LINE | go(endline) |
| BEGINNING OF THE LINE | JUMP TO THE BEGINNING OF THE LINE | go(begline) |
| BOTTOM OF THE DOCUMENT | JUMP TO THE BOTTOM OF THE DOCUMENT | go(bottomfile) |
| TOP OF THE DOCUMENT | JUMP TO THE TOP OF THE DOCUMENT | go(topfile) |
| JUMP TO THE | | go(topfile) |
| END OF FILE | END OF FILE NOW | go(bottomfile) |
| <subphrase 1> NOW | | go(endline) |
| GO TO THE <subphrase 2> | | go(begline) |
| <subphrase 1> | | go(endline) |
| GO TO THE BOTTOM | GO TO THE BOTTOM | go(bottomfile) |
| GO TO THE TOP | GO TO THE TOP | go(topfile) |
| COPY <phrase 5> | COPY THE PREVIOUS WORD TO THE BOTTOM | copy(previousword, bottom) |
| COPY <phrase 6> | COPY THE PREVIOUS WORD TO THE BEGINNING OF THE LINE | copy(previousword, begline) |
| PUT <phrase 5> | PUT THE PREVIOUS WORD TO THE TOP | move(previousword, top) |
| PUT <phrase 6> | PUT THE PREVIOUS WORD TO THE END OF THE LINE | move(previousword, endline) |
| RELOCATE THIS TO BOTTOM | RELOCATE THIS TO THE BOTTOM | move(selection, bottom) |
| MOVE THIS TO TOP | MOVE THIS TO THE TOP | move(selection, top) |
| <phrase 3><phrase 4> | | go(topfile) |
| <phrase 2> NOW | | go(bottomfile) |
| <phrase 1> | | go(topfile) |
| <copy_sentence> | | copy(previousword, bottom) |
| <move_sentence> | | move(selection, top) |
| <go_sentence> | | go(topfile) |

METHOD AND SYSTEM FOR GENERATING A MINIMAL SET OF TEST PHRASES FOR TESTING A NATURAL COMMANDS GRAMMAR

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech recognition and more particularly to a method and system for generating a minimal set of test phrases for testing a natural commands grammar.

2. Description of the Related Art

Speech recognition, also referred to as speech-to-text, is the technology that enables a computer to transcribe spoken words into computer recognized text equivalents. In practice, speech recognition has been employed in spoken command recognition and dictation. Spoken command recognition finds its greatest utility when incorporated in computer game applications, multimedia titles, and application navigation programs. Spoken command recognition can support the recognition of single words or short phrases spoken with continuous speech, such as "Open File". In contrast, the dictation function is most evident in word processing and document generation applications.

During the past decade there has been significant progress in the development of speech recognition systems. In consequence of technical advances in speech modeling techniques and recognition search strategies combined with the increased processing power of workstations and personal computers, large vocabulary continuous speech recognition is now feasible. In conjunction with advances in Natural Language Understanding (NLU), these new technical capabilities have made possible the incorporation of more natural styles of human-computer verbal interactions.

NLU technology represents the next generation of speech technology to come to market. Specifically, NLU technology permits a computer to understand the meaning of spoken or typed words. Moreover, NLU can render possible a computer's understanding of a query or statement put forth in natural human language. Simply put, using NLU technology a computer can understand not merely spoken words, but the meaning behind each spoken word. Software applications that seek to exploit this technology include expert systems, applications having user "wizards", database access systems for problem resolution, database search engines including the Internet, and combined query and response systems.

Related to NLU technology, natural command grammars bridge the gap between the simple command grammar and the NLU technology of the future. Natural command grammars, to some extent, represent the middle ground between the simple command grammar and NLU. Specifically, the natural command grammar is a finite state grammar that allows NLU-like flexibility in the number of allowable expressions per function. Presently, the nature of continuous speech recognizers necessitates a grammar's specification of every possible utterance potentially provided to the application. Significantly, the constraints on word choice imposed by these grammars can reduce perplexity and, accordingly, can lower the recognition error rate.

Although there are a number of approaches to structuring a natural commands grammar, the recognizer grammar commonly specified using Backus-Naur Form (BNF) seems most logical and has become widely used. The structure of the BNF grammar has comments, a root node branching out to sentence set nodes, sentence set nodes that branch out to sentences, or natural commands, variables in sentences that connect to phrase nodes, and a translation rule at the end of each line of grammar. It is the translation rule that translates the natural command into a functional statement which can be used by a back-end program to execute the program's functions without requiring a separate parsing program.

While simple grammars are relatively easy to develop and test, more complex grammars, including NLU and natural command grammars, are very difficult to develop and test comprehensively. For natural command grammars, the number of valid commands is for all practical purposes infinite, precluding exhaustive testing. Hence, testing every possible phrase in a natural commands grammar to verify correct interpretation by a translation rule interpreter, or other parsing technique, can be extraordinarily difficult and extremely inefficient. Current methods provide only for manual testing of each translation rule. Moreover, manual testing has proven error prone and time consuming. No present method can automatically create a minimum set of test sentences.

SUMMARY OF THE INVENTION

The invention concerns a method and system for automatically generating a minimal set of test phrases for testing a natural commands grammar. The invention as taught herein has advantages over all known methods now used to produce test cases for a natural commands grammar, and provides a novel and nonobvious system, including apparatus and method, for automatically generating a minimal set of test phrases for testing a natural commands grammar. The method involves selecting a line of text, the line having a valid phrase for the natural commands grammar and a translation rule for translating the valid phrase into a functional statement; forming a test phrase for the selected line of text; detecting a previous inclusion of the test phrase in the minimal set of test phrases; and, adding the test phrase to the minimal set of test phrases only if the test phrase has not been previously included in the minimal set of test phrases.

Additionally, the forming step can include identifying the selected line as either a sentence line or sub-sentence line; searching the natural commands grammar for a sentence line having a valid phrase incorporating the identified sub-sentence line; repeating the searching step and the determining step if the sentence line found in the searching step is determined to have been previously considered in the searching step; and, composing a test phrase from the valid phrase of the sentence line found in the searching step. As part of the forming step, the composing step can comprise determining whether the sentence line is a terminal node or non-terminal node; extracting from the sentence line of a node determined to be non-terminal, each variable incorporated in the sentence line; obtaining a valid phrase from each sub-sentence line corresponding to each extracted variable; combining each valid phrase obtained in the obtaining step with the valid phrase of the selected sentence line determined to be a non-terminal node in the determining step;

and, designating the combined valid phrase as a test phrase. Finally, the detecting step can include detecting the test phrase in the minimal set of test phrases; and, determining a previous use of the test phrase detected in the minimal set of test phrases.

BRIEF DESCRIPTION OF THE DRAWINGS

There are presently shown in the drawings embodiments which are presently preferred, it being understood, however, that the invention is not limited to the precise arrangements and instrumentalities shown.

FIG. 1 is an example of a BNF natural commands grammar.

FIG. 3 is a minimal set of test phrases created by the process illustrated in FIGS. 2A–2C for the BNF natural commands grammar listed in FIG. 1.

DETAILED DESCRIPTION OF THE INVENTION

Figure 2A:
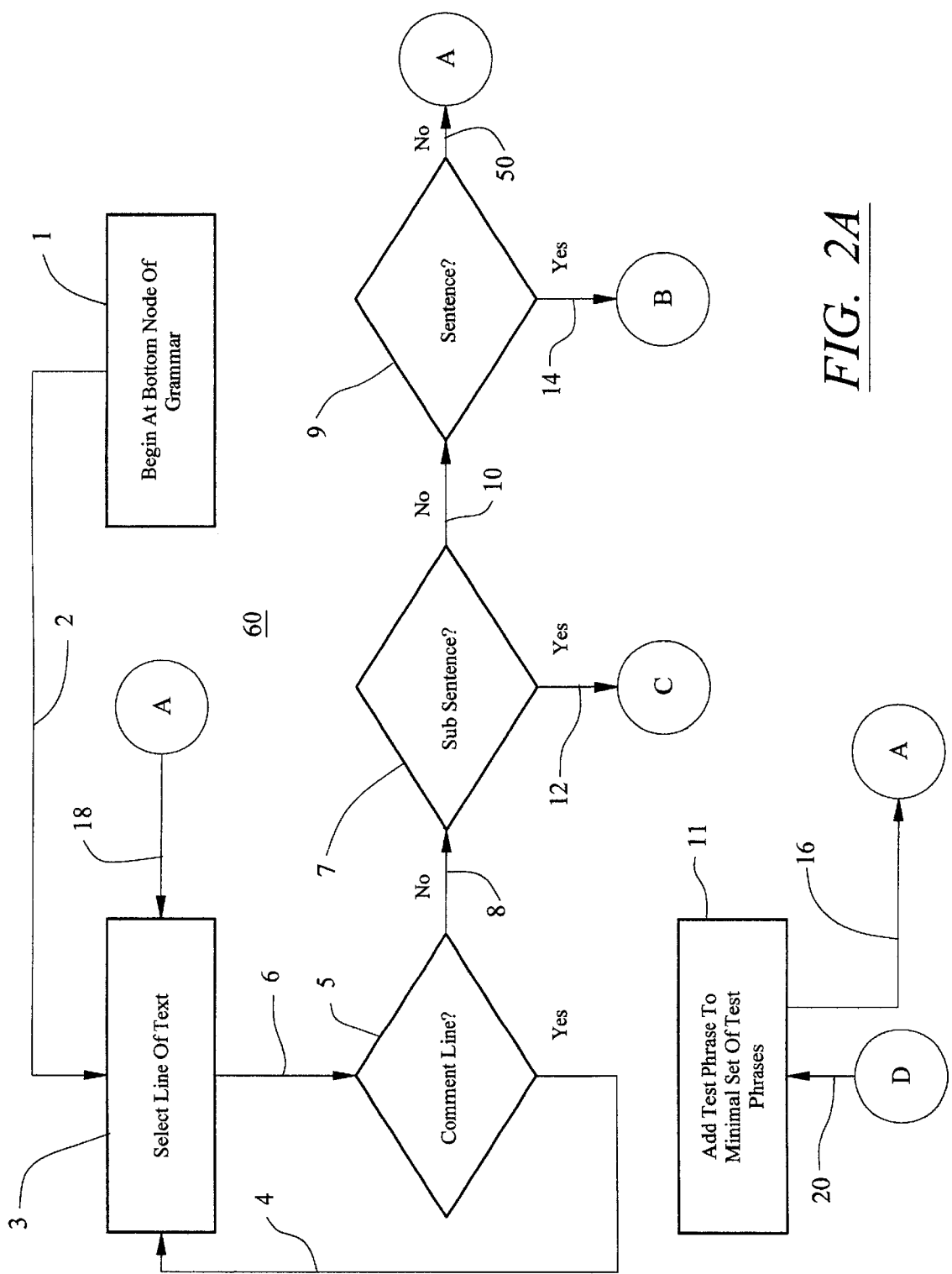
FIGS. 2A–2C taken together, are a flow chart illustrating a process for generating a minimal set of test phrases for testing a natural commands grammar.

A grammar contains a representation of the valid expressions for a speech-enabled computer program. FIG. 1 illustrates a BNF grammar, although the inventive arrangements are not restricted to use with a BNF grammar. Rather, it will be appreciated by one skilled in the art that the inventive arrangements will work for any grammar. Although many approaches exist with respect to structuring a natural commands grammar, the approach illustrated in FIG. 1 has been used in practice, for example in IBM's ViaVoice '98®. In FIG. 1, the structure of the BNF grammar includes comments 51, a root node 52 branching out to sentence set nodes 53, sentence set nodes 53 that branch out to sentences or natural commands 54, variables 55 in sentences 54 that connect to phrase nodes 56, and a translation rule 57 at the end of each line of grammar. One skilled in the art will recognize that there is no limit to the extent to which the designer of a grammar can use variables in one node that point to a lower node. For instance, FIG. 1 shows variables 55 in phrase nodes 56 point to subphrase nodes 58. At some point, however, all variables 55 connect to a node with no variables—a terminal node 59 as shown in FIG. 1.

In FIG. 1, the root node 52 points to three sentence set nodes 53, defined below root node 52. Each sentence set node 53 contains the valid phrase for the grammar, and a translation rule 57 that translates the natural command into a functional statement. One skilled in the art will observe that translation rules are a convenience in a grammar for getting the spoken phrase into a form that auxiliary programs can use to execute program functions without necessitating a separate parsing program. A grammar with translation rules provides a clear indication of the location of the sentence set nodes. All valid phrases in a grammar correspond to a sentence in a sentence set node. When a speaker utters a valid phrase, a speech recognition system employing a BNF grammar can transmit the translation rule, complete with parameters as indicated by the variable content of the valid phrase, to a translation rule interpreter. Once interpreted, the system performs the actions as defined by the translation rule's function. The translation rules provide a way to unambiguously identify phrases that have the same functional consequences—they identify the alternate ways to say something in a given grammar.

For instance, with the code shown in FIG. 1, if a user said "Go to the start of the line," the translation rule would be "go(begline)." Likewise, if a user said "Go to the beginning of the line," the translation rule produced would also be "go(begline)." If a user said something with a different meaning, however, then the translation rule produced would be different. For example, "Go to the top" would produce "go(topfile)." It will be recognized by those skilled in the art that many different translation rules are possible for use with different commands and formats, all such rules being within the scope of the invention. Significantly, methods other than those which utilize translation rules exist which can translate the spoken phrase into a computer recognizable command. For instance, it is well known in the art to use both annotations which facilitate the development of parsing routines, and parsing routines which do not require annotations. Nevertheless, the preferred embodiment operates best using a conventional BNF grammar.

From a logical analysis, it is clear that all translation rules will be exercised by a set of sentences that number the same as the number of lines, excluding comments, in the command grammar. Simply put, there should be a test phrase for each translation rule in the grammar. In the example of FIG. 1, for instance, a complete set of test phrases would number thirty. Yet, the act of testing translation rules at the sentence set level eliminates the need for a specific test case for the translation rules at the root node level. Again, in the example of FIG. 1, an equally comprehensive set of test phrases would number 27.

Recognizing that the act of testing sub-sentence translation rules necessarily involves creating a test phrase leads to the realization that it is possible to further reduce the required number of test phrases. The amount of reduction corresponds to the specific grammar structure to be tested. At one extreme, if it were possible to create test phrases for sub-sentence translation rules using all of the sentence level translation rules, then the number of required test phrases would be reduced by the number of sentence-level translation rules. In contrast, if it were possible only to test all sub-sentence translation rules using a single sentence-level translation rule, then the number of required test phrases would be reduced only by one.

The parts of FIG. 2 are a flow chart illustrating the various steps of a method 60 for testing a natural commands grammar in accordance with the inventive arrangements. As shown in FIG. 2A, the method 60 begins in step 1 at the bottom node of the command language grammar. Following path 2 to block 3, a line of text is selected for evaluation. In decision block 5, if the selected line of text is a comment line, the selected line of text is ignored and, following path 4 to block 3, another line of text is selected for evaluation. Continuing along path 8 to decision block 7, in the event the selected line of text is a sub-sentence, the method 60 branches along path 12 to jump circle C. Otherwise, following along path 10 to decision block 9, in the event the selected line of text is a sentence, the method 60 branches along path 14 to jump circle B. In all other cases, following path 50 to jump circle A, the selected line of text is ignored and another line of text is selected for evaluation.

Figure 2B:
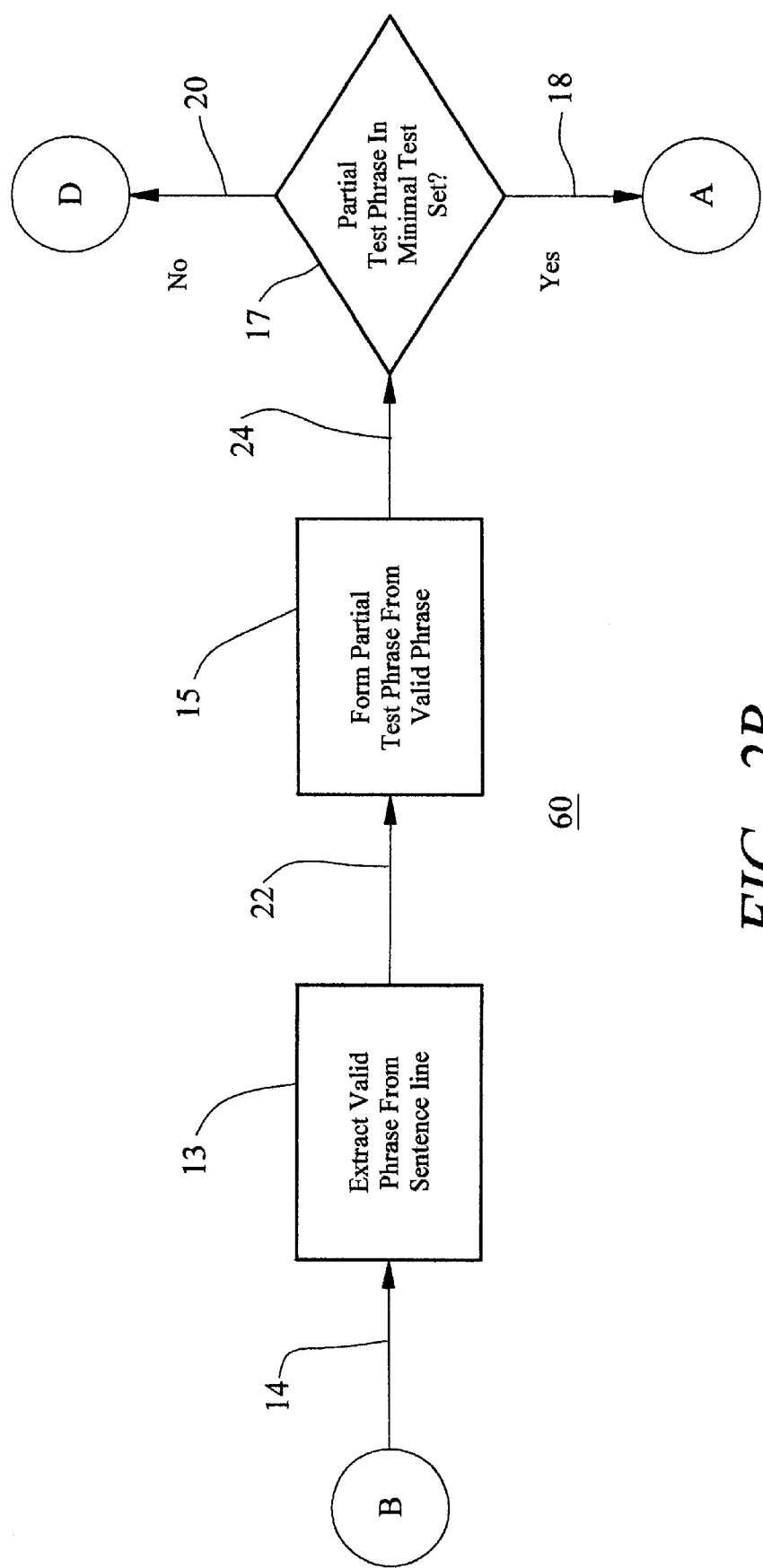

FIG. 2B is a continuation of path 14 connected by jump circle B of FIG. 2A, where the selected line of text is a sentence line of text. In that event, a valid phrase is extracted from the sentence line in block 13. Subsequently, a partial test phrase is formed in block 15 from the valid phrase extracted in block 13. Following path 24 to decision block 17, if the partial test phrase has already been added to the minimal set of test phrases for the command language grammar, the test phrase is discarded and, following path 18 to block 3, a new line of text is selected for examination. If, in decision block 17, the partial test phrase does not appear in the minimal set of test phrases, following path 20 to block 11 in FIG. 2A, the test phrase is added to the minimal set of test phrases.

Figure 2C:
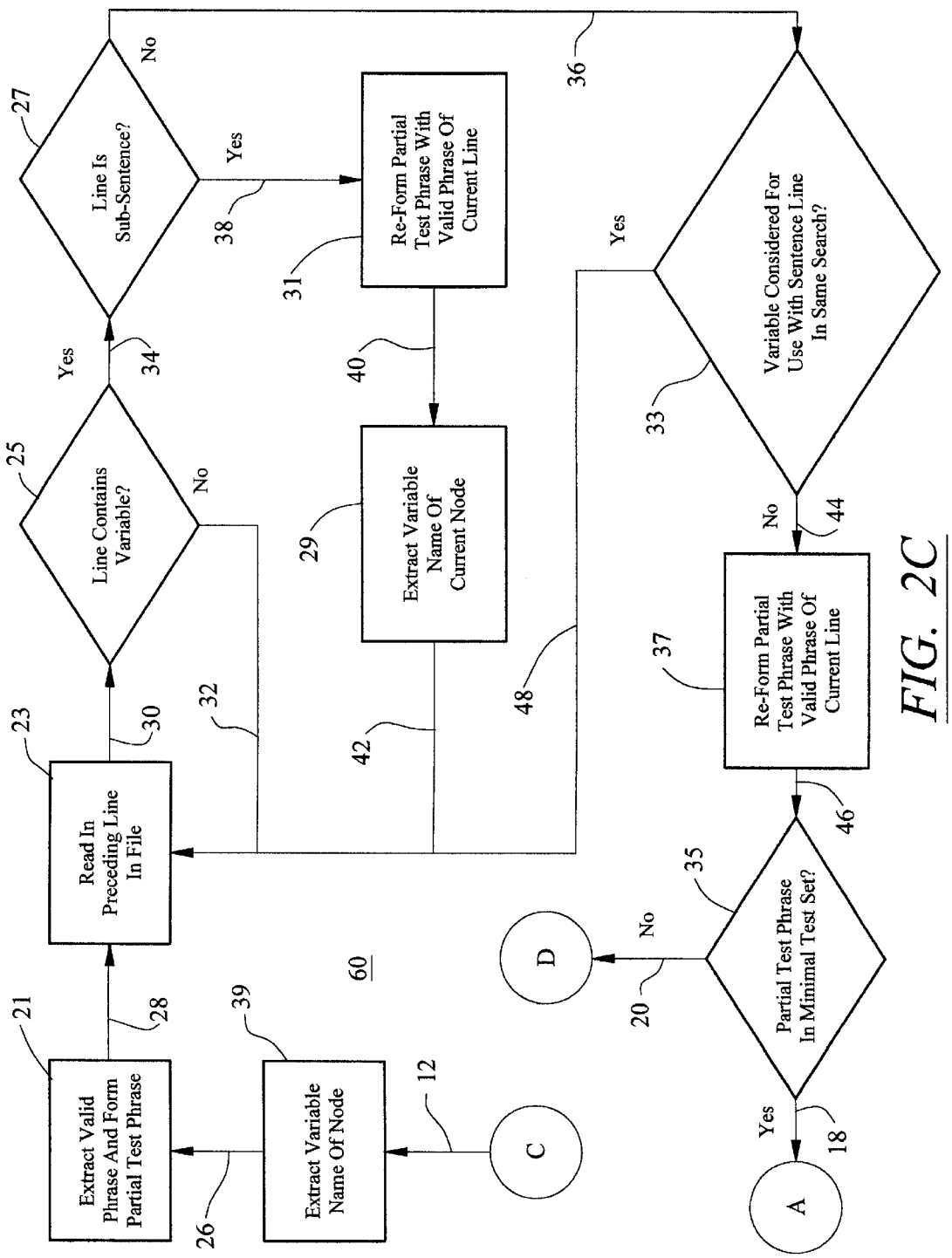

FIG. 2C is a continuation of path 12 connected by jump circle C of FIG. 2A, where the selected line of text is a sub-sentence line of text. In that event, the variable name of the node containing the selected sub-sentence line of text is extracted in block 19. Following path 26 to block 21, a valid phrase is extracted from the sub-sentence line of text and a partial test phrase is formed from the valid phrase. In block 23, the preceding line is read in for examination. If, in decision block 25, the preceding line of text does not contain the variable extracted in block 19, the next preceding line of text is read in for examination. In contrast, if the preceding line of text does contain the variable extracted in block 19, the line preceding line is identified as either a sub-sentence or sentence in decision block 27.

If the preceding line containing the extracted variable is a sub-sentence, following path 38 to block 31, the partial test phrase is re-formed by combining the valid phrase of the preceding line with the previously formed test phrase. Subsequently, the variable name of the node containing the previously extracted variable is extracted in block 29. following path 42 to block 23, the next preceding line is read in for examination and the process repeats, the partial test phrase continually being re-formed, until a sentence node is encountered in decision block 27. In accordance with the inventive arrangements, it is particularly advantageous to produce test phrases by beginning with the last node in the grammar and working up because to iterate up through the grammar, it is necessary only to check the variable name of the node, find it referenced higher in the grammar, check the variable name of that node, find it referenced higher in the grammar, and continue until hitting a node that produces a sentence-level translation rule.

When the preceding line containing the extracted variable is determined to be a sentence according to decision block 27, following path 36 to decision block 33, the variable name extracted in block 29 is tested for previous use in the current sentence line during the current search. If the variable name has been incorporated during the current search in the current sentence line, following the path 48 to block 23, the next preceding line is read in for examination and the process is repeated. Otherwise, following the path 44 to block 37, the partial test phrase formed in either block 31 or 21 is re-formed to create a new partial test phrase. Following path 46 to the decision block 35, the contents of the minimal set of test phrases are examined for the listing of the newly re-formed partial test phrase. If the partial test phrase appears in the minimal set of test phrases, the partial test phrase is discarded and, following path 18 to block 3, a new line of text is selected for examination. Otherwise, following path 20 to block 11, the partial test phrase is added to the minimal set of test phrases.

FIG. 3 is a list of a minimal set of test phrases 70 generated using method 60 illustrated in FIGS. 2A–2C as applied to the BNF grammar described in FIG. 1. It can be seen from the list 70 that a minimal set of test phrases needs to include only 21 valid test phrases. So, to create this minimal set of test phrases, the strategy differs depending on whether the line for which the test phrase is being created is a sub-sentence or sentence-level line. For sub-sentence level lines, the appropriate strategy includes tracking previously used sentence-level lines used in those test phrases and, as new test phrases are developed, seek to use unused sentences. In contrast, for sentence-level lines, the appropriate strategy includes developing new test cases only for those lines unused in sub-sentence level test cases.

What is claimed is:

1. A method for automatically generating a minimal set of test phrases for testing a natural commands grammar comprising the steps of:

selecting a line of text from within said natural commands grammar having a valid phrase for said natural commands grammar and a translation rule for translating said valid phrase into a functional statement;

forming a test phrase for said selected line of text;

detecting a previous inclusion of said test phrase in said minimal set of test phrases; and, adding said test phrase to said minimal set of test phrases only if said test phrase has not been detected as having been previously included in said minimal set of test phrases in said detecting step.

2. The method according to claim 1, comprising the step of distinguishing between selected sentence lines of text and selected sub-sentence lines of text.

3. The method according to claim 2, further comprising the steps of:

in response to said selected line of text being distinguished as a sentence line, determining whether said sentence line is a terminal node or a non-terminal node;

in response to said selected sentence line being distinguished as a non-terminal node, extracting from said selected sentence line each variable incorporated in said sentence line;

obtaining a valid phrase from each sub-sentence line corresponding to each said extracted variable; and, forming a test phrase by inserting each obtained valid phrase in place of each corresponding variable in said selected sentence line forming valid phrase.

4. The method according to claim 2, further comprising the steps of:

in response to said selected line of text being distinguished as a sub-sentence line, searching said natural commands grammar for a sentence line having a valid phrase referencing said distinguished sub-sentence line;

determining whether said sentence line found in said searching step has been previously considered in said searching step for having referenced said sub-sentence line;

in response to said sentence line having been determined in said determining step to have been previously considered in said searching step, ignoring said sentence line found by said searching means, and repeating said searching step, said distinguishing step, and said determining step; and, in response to said sentence line having been determined in said determining step not to have been previously considered in said searching step, composing a test phrase from said valid phrase of said sentence line found in said searching step.

5. The method according to claim 1, wherein said detecting step comprises:

detecting said test phrase in said minimal set of test phrases; and, determining a previous use of said test phrase detected in said minimal set of test phrases.

6. A system for automatically generating a minimal set of test phrases for testing a natural commands grammar containing lines of text, each said line of text having a valid phrase for said natural commands grammar and a corresponding translation rule for translating said valid phrase into a functional statement, said system comprising:

means for selecting said line of text from within said natural commands grammar;

means for forming a test phrase for said selected line of text;

means for detecting a previous inclusion of said test phrase in said minimal set of test phrases; and, means for adding said test phrase to said minimal set of test phrases only if said test phrase has not been detected as having been previously included in said minimal set of test phrases by said detecting means.

7. The system according to claim 6, comprising means for distinguishing between selected sentence lines of text and selected sub-sentence lines of text.

8. The system according to claim 7, further comprising:

means, operable in response to said selected line of text being distinguished as a sentence line, for determining whether said sentence line is a terminal node or a non-terminal node;

means, operable in response to said selected sentence line being distinguished as a non-terminal node, for extracting from said selected sentence line each variable incorporated in said sentence line;

means for obtaining a valid phrase from each sub-sentence line corresponding to each said extracted variable; and, means for forming a test phrase by inserting each obtained valid phrase in place of each corresponding variable in said selected sentence line forming valid phrase.

9. The system according to claim 7, further comprising the steps of:

means, operable in response to said selected line of text being distinguished as a sub-sentence line, for determining whether said sentence line found by said searching means has been previously considered by said searching means for having referenced said sub-sentence line;

means, operable in response to said sentence line having been determined by said determining means to have been previously considered by said searching means, for ignoring said sentence line found by said searching means, and means for repeating said searching by said searching means, said distinguishing by said distinguishing means, and said determining by said determining means; and, means, operable in response to said sentence line having been determined by said determining means not to have been previously considered by said searching means, for composing a test phrase from said valid phrase of said sentence line found by said searching means.

10. The system according to claim 6, wherein said detecting means comprises:

means for detecting said test phrase in said minimal set of test phrases; and, means for determining a previous use of said test phrase detected in said minimal set of test phrases.

* * * * *